United States Patent [19]

Gerrald

[11] 3,758,664
[45] Sept. 11, 1973

[54] PROCESS FOR PRODUCING AMMONIUM DIURANATE

[75] Inventor: Lonnie D. Gerrald, Columbia, S.C.

[73] Assignee: Westinghouse Electric Corporation, Pittsburgh, Pa.

[22] Filed: Dec. 29, 1970

[21] Appl. No.: 102,451

[52] U.S. Cl.................. 423/15, 423/253, 423/261
[51] Int. Cl............................................ C01g 43/00
[58] Field of Search.................. 23/335, 346, 355

[56] References Cited
UNITED STATES PATENTS

| | | | |
|---|---|---|---|
| 3,579,311 | 5/1971 | McCoy | 23/335 |
| 3,394,997 | 7/1968 | Hollander | 23/335 |
| 3,272,602 | 9/1966 | Suehiro et al. | 23/335 |
| 2,466,118 | 4/1949 | Miller et al. | 23/335 |

Primary Examiner—Carl D. Quarforth
Assistant Examiner—F. M. Gittes
Attorney—F. Shapoe

[57] ABSTRACT

A process for the recovery of uranium as ammonium diuranate from aqueous solutions having uranyl and fluoride ions such as produced by hydrolyzing $UF_6$, and for reducing soluble uranium losses in the liquid waste stream, by forming a first neutralized solution of uranyl fluoride ($UO_2F_2$), with concentrated ammonium hydroxide, at a pH of about 4.5 to 6.0, and then by precipitating essentially all of the uranium, as ammonium diuranate, $[(NH_4)_2U_2O_7]$, (ADU), from the solution by adding concentrated ammonium hydroxide under controlled conditions preventing formation of any soluble fluoride complexes that would otherwise be ordinarily formed during the precipitation of the ammonium diuranate, to produce an ADU slurry which is calcinable to $UO_2$ having good ceramic pelletizing properties.

2 Claims, 1 Drawing Figure

Patented Sept. 11, 1973
3,758,664
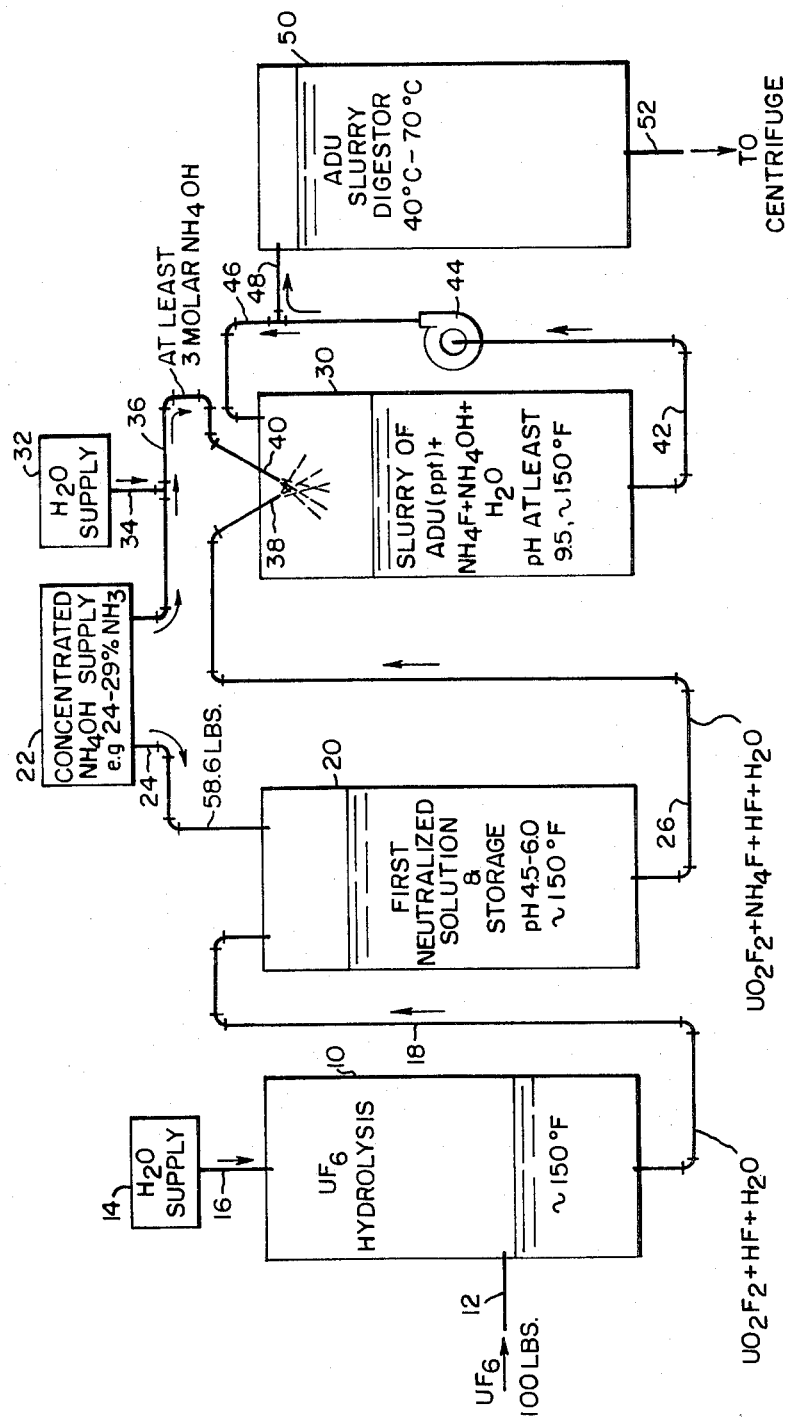
WITNESSES:
Bernard R. Gieguay
James F. Young
INVENTOR
Lonnie D. Gerrald
BY
Frederick Shapoe
ATTORNEY

PROCESS FOR PRODUCING AMMONIUM DIURANATE

BACKGROUND OF THE INVENTION

1. Field of the Invention

This invention relates to a process for the recovery of uranium values from aqueous solutions containing uranyl and fluoride ions, and, more particularly, it pertains to the conversion of uranium hexafluoride to ammonium diuranate by a two stage treatment with concentrated ammonium hydroxide.

2. Description of the Prior Art

One method of preparing uranium dioxide ($UO_2$) from uranium hexafluoride ($UF_6$), involves an initial reaction of the $UF_6$ with water to form an aqueous hydrolysis solution of uranyl fluoride ($UO_2F_2$) and hydrofluoric acid (HG). Thereafter, it has been one conventional practice, as set forth in U.S. Pat. No. 2,466,118, to add a concentrated solution of ammonium hydroxide greatly in excess of the necessary stoichiometric amount of ammonium hydroxide, preferably 2 to 3 times greater than stoichiometric, to react with the uranyl fluoride solution in order to precipitate the uranium in the form of ammonium diuranate [ $(NH_4)_2U_2O_7$ ]. The latter compound was then digested at a specific temperature after which additional ammonium hydroxide was added, at least 5 times and preferably 7 to 13 times stoichiometric, to prevent substantial complexing of the uranyl ions by any fluoride ions. It will be understood that these processes required large excesses of ammonium hydroxide. Another variation thereof is disclosed in U.S. Pat. No. 3,394,997, wherein large volumes of dilute, less than 1.2 molar, ammonium hydroxide to provide from 7 to 12 moles of $NH_3$ for each mole of uranium.

The precipitation of ammonium diuranate [ $(NH_4)_2U_2O_7$ ] with ammonium hydroxide is not complete at the stoichiometric point because of the complex nature of the uranyl fluoride solutions. A large excess of the ammonium hydroxide is used to drive the reaction to completion. An example of the reaction is set forth in the following formula:

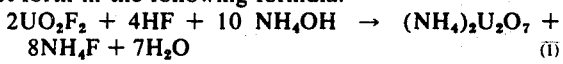

$$2UO_2F_2 + 4HF + 10\ NH_4OH \rightarrow (NH_4)_2U_2O_7 + 8NH_4F + 7H_2O \qquad (1)$$

A disadvantage of the foregoing one step procedure is that it requires a great excess of ammonium hydroxide. A more critical shortcoming is that the ammonium diuranate precipitate formed does not completely separate and recover all of the uranium from the uranyl fluoride. These reaction products often include from 1.5 to 2.0 percent of uranium fluoride present as a mixed fluoride, particularly $UO_2F_2 \cdot 3NH_4F$, which is relatively soluble and which therefore leads to a loss of uranium in the waste stream. Such fluoride complexes are extremely difficult to break in order to recover the uranium. Also it is desirable to produce ADU precipitate with the smallest possible traces of fluorides.

From extended investigation it has been found that formula (1) defines an ideal reaction which in fact does not occur quantitatively even under the most ideal conditions. In practice it has been found that the one step reaction of formula (1) results in a number of side reactions which occur so rapidly that the HF does not preferentially react to completion with $NH_4OH$ to produce $NH_4F$. Rather, other reactions occur simultaneously between HF, $UO_2F_2$, and $NH_4OH$, which result in formation of the soluble uranium complexes, i.e., $UO_2F_2 \cdot 3NH_4F$. Once these uranium complexes are formed they remain in solution and the uranium values are lost because they cannot be readily recovered therefrom and are carried away in the waste stream or require costly ion exchange or other treatments for their recovery.

In addition, the process of U.S. Pat. No. 2,466,118 employs a concentrated solution of ammonia (8 to 15 molar), because in that fluoride system the solubility of uranium is lowest when the ratio of ammonia to uranium is highest. Thus, the initial addition of concentrated ammonium hydroxide is sufficient to precipitate a major portion of uranium, and suitably constitutes an excess over the stoichiometric quantity of ammonium hydroxide required to neutralize any acidity and to precipitate all of the uranium in the absence of fluoride ions. The resulting product, $UO_2$, is finely divided and is difficult to dewater and dry.

The process of U.S. Pat. No. 3,394,997 employs a large volume of dilute aqueous ammonium solution substantially less than 2 molar, and preferably 0.7 to 1 molar, to precipitate ammonium diuranate [ $(NH_4)_2U_2O_7$ ], which is relatively crystalline and granular in nature. While the resulting product $UO_2$ readily dewaters and dries rapidly it does not possess optimum ceramic sinterability properties. The process is still subject to a complex recovery procedure to minimize uranium loss.

In a copending application Ser. No. 865,232, assigned to the assignee of the present invention, there is disclosed a process for converting a hydrolysis solution of uranium hexafluoride by adding thereto only dilute ammonium hydroxide (about 1 molar). The dilute ammonium hydroxide necessarily introduce very large volumes of water which not only require larger reaction and holding or storage vessels, and larger piping and pumps but also require more equipment to separate the ADU precipitate from the water with dissolved $NH_4F$. The large volumes of $NH_4F$ solution impose a disposal problem, because of its large $NH_4OH$ content.

Although the specific reaction for the precipitation of $UO_2F_2$ under equilibrium conditions with $NH_4OH$ should lead, at least as an initial step, to hydrated $UO_2 \cdot (OH)_2$, it is believed that other additional reactions occur (such as dimerization, hydration, and ammoniation) to preclude the exclusive specific reaction intended. Stoichiometric ammonium diuranate has never been reported as being directly produced from aqueous medium directly in a single step so that polymerization most probably must occur.

Ammonium diuranate is believed to be a more complex compound than is indicated by the commonly accepted formula $(NH_4)_2U_2O_7$. There are indications that some molecules may have many atoms of uranium, up to 7 or more, and that more than two ($NH_4$) groups may be present. However, the formula $(NH_4)_2U_2O_7$ represents quite closely the average composition of this complex uranium compound.

SUMMARY OF THE INVENTION

In accordance with this invention it has been found that the foregoing disadvantages may be overcome by first partially neutralizing with concentrated ammonium hydroxide the hydrolysis solution of uranium hexafluoride which contains uranyl fluoride ($UO_2F_2$) to form the compound ammonium fluoride ($NH_4F$) with the solution being at a pH of from about 4.5 to about 6.0, a good average being a pH of 5.0, which prevents the uranyl ion from entering fluoride complexing reactions at that time or during subsequent reactions. The process requires an initial addition of a solution of concentrated ammonium hydroxide at least about 3N, for example, about 24 to 29% $NH_3$, to the uranyl fluoride solution to form ammonium fluoride with about 85–95% of the HF, with only 5 to 15 percent of the HF being unreacted. After equilibrium is reached, more concentrated ammonium hydroxide (from 3 to 6 molar) is thoroughly and rapidly admixed with the first neutralized solution in a second step to form ammonium diuranate precipitate almost quantitatively. The reaction is carried out with the first neutralized solution being at about 150°F and the ammonium hydroxide being below 100°F so that the exothermic reaction does not raise the temperature above about 175°F. The quantity of ammonium hydroxide is such as to provide from two to about three times the stoichiometric quantity needed to react with the uranyl fluoride to produce ammonium diuranate therefrom. The pH of the solution should be at least 9.5, and may reach a pH of 10 or slightly more. A large excess, beyond this point, of ammonium hydroxide solution is to be avoided. Under these conditions the ammonium diuranate reaction is essentially complete and substantially no complexes of uranium and fluoride result. A minimum volume of water per mol of uranium is employed in both steps. After digestion at from 40°C to 70°C for from 5 to 30 minutes, the ammonium diuranate forms a readily separable precipitate product which is flowable or pumpable as a slurry in a small amount of water. When subsequently reduced to uranium dioxide by calcining at 400°C to 1000°C, this ADU product results in uranium dioxide with excellent ceramic pelletizing properties for fuel element applications.

BRIEF DESCRIPTION OF THE DRAWINGS

For a better understanding of the invention reference is made to the drawings, in which FIG. 1 is a flow sheet of an embodiment of the process of this invention.

DESCRIPTION OF THE PREFERRED EMBODIMENT

In accordance with the present invention, the process for recovering uranium from an aqueous solution containing uranyl and fluoride ions, which aqueous solution may be produced by introducing $UF_6$ into water for example, in a ratio of one pound of $UF_6$ per 10 pounds of water thereby forming a hydrolysis product thereof, involves two key steps. The first step proceeds according to the following formula:

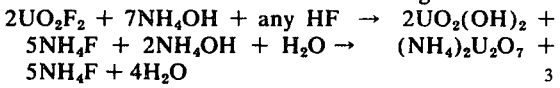

$$UO_2F_2 + 4NH_4OH + 4HF \rightarrow UO_2F_2 + 4NH_4F + 4H_2O + \text{slight amount of HF}, \quad 2$$

having an equilibrium pH of about 4.5 to 6.0. About 85 to 95 percent of the HF is neutralized to $NH_4F$, with from 5 to 15 percent HF remaining. The ammonium hydroxide is concentrated, at least 12N, the preferred range being from about 24 to 29 percent $NH_3$. As shown in the formula (2) the amount of ammonium hydroxide added to a solution containing uranyl fluoride and hydrogen fluoride is limited to slightly less than the stoichiometric amount of ammonium hydroxide needed to react with all of the hydrogen fluoride present. However, it is critical that the resulting first neutralized solution be acidic with a slight amount of HF remaining unneutralized so that the pH of the solution at equilibrium is from about 4.5 to about 6.0, so that no ADU precipitate forms. Accordingly, in formula (2) only the $NH_4OH$ and HF interact to form $NH_4F$ and $H_2O$, the $UO_2F_2$ being essentially unreacted at this stage.

By limiting the amount of the ammonium hydroxide added, as well as by controlling the resulting solution pH, only water soluble ammonium fluoride is preferentially formed. Under these conditions any undesirable reactivity of the uranium compound is essentially zero so that the formation of undesirable complexes, such as $UO_2F_2 \cdot 3NH_4F$, does not occur. Thus, as shown in formula (2) nearly all of the fluoride ions of the HF are combined with the ammonium ions to form ammonium fluoride, leaving the uranyl compound free to react with subsequently added dilute ammonium hydroxide.

Because of the use of concentrated ammonium hydroxide, the volume of solution increases only slightly, as compared to reactions using dilute ammonium hydroxide of 1 to 1.2 normality. After equilibrium is reached the resulting first neutralized solution is then rapidly and thoroughly admixed with additional concentrated (about 3 to 6 Normal) ammonium hydroxide, by adding from at least two and up to three or slightly more stoichiometric equivalents to react with the $UO_2F_2$ plus enough to neutralize the residual HF present. The first neutralized solution at from 125°F to 175°F is rapidly mixed, as by spraying it into a spray of relatively cold ammonium hydroxide. The reaction proceeds in accordance with the following formula:

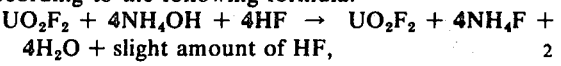

$$2UO_2F_2 + 7NH_4OH + \text{any HF} \rightarrow 2UO_2(OH)_2 + 5NH_4F + 2NH_4OH + H_2O \rightarrow (NH_4)_2U_2O_7 + 5NH_4F + 4H_2O \quad 3$$

In this formula the equation is balanced at the assumed basis that one mole of HF is present for two moles of $UO_2F_2$ though in fact substantially far less HF would usually be present. The reaction-solution will be at about 150°F. As shown, the intermediate product, uranyl hydroxide, immediately reacts with additional ammonium hydroxide to form ammonium diuranate (ADU) with precipitates out of solution. Substantially complete precipitation of the uranium as ADU occurs and essentially no dissolved uranium compound is present in the liquid.

The two-step process involves a time relation. If the total reaction is carried out in a one step reaction by the addtion of $NH_4OH$ in substantial excess of the stoichiometric amount required to neutralize HF, the reactions are so rapid that the $NH_4F$ being formed cannot be prevented from entering into the formation of the undesired uranium complexes before the critically necessary $UO_2(OH)_2$ forms.

As a result of the two-step process less uranium is lost in the waste stream in the form of fluoride complexes which are difficult and costly to separate and to recover. Relatively minimal amounts of waste liquid need to be disposed of and pollution is minimal. The waste liquid is passed through an ion exchange column to absorb any traces of uranium in the solution.

The ADU forms a fine, non-colloidal precipitate. In order to improve the precipitate, it is pumped as a slurry to a digestor where it is held at from 40°C to 70°C for from 5 to 30 minutes. The digestor output comprises a slurry with larger ADU particles which can be readily treated in a centrifuge to extract a major proportion of the liquid, leaving a flowable or pumpable slurry containing the ADU as a major component.

The latter slurry is then introduced into a calcining kiln where three successive reactions occur: first, in an initial relatively cool zone the water is driven off leaving only ADU powder; secondly the ADU is thermally decomposed at a higher temperature to $UO_3$ and $U_3O_8$, and $NH_3$ gas as well as steam are given off, and finally, a reducing gas such as hydrogen is passed over the uranium oxides while at from about 400°C to 1,000°C to convert the uranium to uranium dioxide powder. Traces of mechanically adsorbed or otherwise present fluorides also are evaporated in the kiln.

The fineness and structural nature of the ADU particles in the slurry fed to the calcining kiln determine the ceramic pelletizing qualities of the uranium dioxide powder. The ADU product of the process of this invention has shown outstanding ceramic pelletizing qualities. When pelleted properly and fired, pellets of enriched uranium dioxide of excellent quality for nuclear reactor purpose are obtained.

In the second step (formula 3), for each mole of uranyl fluoride present at least 7 moles (and preferably 15 to 25 moles) of ammonium hydroxide are added. The ammonium hydroxide should be at least 3N, and is preferably about 6 Normal.

It has been found that the uranium in the waste stream by the two step procedure of this invention is greatly reduced as compared with the losses in the best previously known single step procedure of conventional methods wherein a 7 to 13 fold stoichiometric excess of ammonium hydroxide to uranyl fluoride is employed. This results because the process of the present invention overcomes the disadvantages of prior procedures; namely, the use of the minimal amounts of water in the ammonium hydroxide, and the substantially negligible formation of relatively stable, water soluble fluoride complexes with uranium, that lead to the presence of uranium in the waste stream. Once the complexes are formed they are exceedingly difficult to recover. As a result, the present process enables the recovery of nearly all of the uranium involved in the reaction.

The following example illustrates the practice of the invention:

EXAMPLE

Referring to the drawing, gaseous uranium hexafluoride is passed via conduit 12 at the rate of 100 pounds per hour into a hydrolysis tank 10. The gaseous uranium hexafluoride may be produced by heating a tank of $UF_6$ to a temperature of, for example, 225°F to 250°F. Pure water is introduced at the rate of 1,010 pounds per hour into tank 10 from a supply tank 14 via pipe 16 by spraying or trickling over a packing where it absorbs and hydrolyzes the $UF_6$ as follows:

$UF_6 + 2H_2O \rightarrow UO_2F_2 + 4HF$

The reaction is exothermic (and steam is added) so that the resulting hydrolyzate is at about 150°F.

The hydrolyzate from tank 10 is conveyed by conduit 18, at the rate of 1,110 pounds per hour, to a first neutralizing tank 20. Concentrated aqueous ammonium hydroxide at least 12N, and preferably having from 24 to 29 percent $NH_3$ concentration, is carried from supply tank 22 by a conduit 24 at the rate of 58.6 pounds (29% $NH_3$) per hour and admixed rapidly with the hydrolysis solution entering via conduit 18. This quantity of ammonium hydroxide will be sufficient to react with approximately 90 percent of the HF present in the hydrolyzate. The pH of the resulting first neutralized solution will be about $5 \pm 0.5$. The temperature of the solution will be about 150°F.

The first neutralized solution, comprising an aqueous solution of $UO_2F_2$, $NH_4F$, and HF, is pumped through conduit 26 to an ADU precipitation tank 30 into which it is sprayed at the rate of 1,168 pounds per hour. Since the first neutralized solution is at about 150°F and the reaction with ammonium hydroxide is exothermic so that $NH_3$ would tend to flash off, the concentrated ammonium hydroxide solution carried by pipe 36 from supply tank 22 is diluted with cold water carried into pipe 36 by pipe 34 from a tank 32. However, the most rapid and complete reaction occurs when the solution mixture is between 125°F and 175°F. A desirable quantity is 1.5 gallons of cold water per gallon of concentrated ammonium hydroxide. The diluted ammonium hydroxide solution is below 100°F, for example at 70°F to 90°F, and is at least 3 molar, and preferably up to about 5N to 6N. About 650 to 700 pounds an hour of 5N solution may be used in this case. By spraying at 40 the diluted ammonium hydroxide so that the spray impinges upon and commingles with the spray of first neutralized solution from spray head 38 rapid admixing with essentially complete reaction takes place. There results a fine precipitate of yellow ammonium diuranate comprising substantially all of the uranium in the solution. The sprayed solutions form a slurry or suspension of fine ADU particles carried in the liquid in the tank 30. The pH in the tank 30 is at least 9.5, and preferably about 10.0 to 10.5.

In order to keep the ADU slurry suspended and the reaction completed, it is rapidly withdrawn from the bottom of tank 30 by a pipe 42 leading to a pump 44. A major proportion of the slurry is returned from the pump outlet by conduit 46 to tank 30. A portion of the pumped slurry is conveyed by conduit 48, branching from conduit 46, to an ADU slurry digestor tank 50 where it is held for from 5 to 30 minutes at from 40° to 70°C. After being held in the digestor, the fine ADU particles agglomerate to larger, readily separable particles.

An outlet 52 conveys the digested ADU slurry to a suitable dewatering means, preferably a centrifuge wherein most of the liquid comprising water having dissolved therein $NH_4F$ and $NH_4OH$, is separated. The centrifuge is set so that the solid output of ADU has sufficient liquid so that it is pumpable or flowable so that it can be metered at a desirable rate into the calcining kiln. In the kiln the water is evaporated, the dry particles of ADU are thermally decomposed and the resulting uranium oxides are reduced to a uranium dioxide powder.

It is difficult to examine any specific ADU precipitate and judge its ultimate ceramic pellet sinterability characteristics. It is known that an extremely fine precipitate has poor ceramic properties, as does a very coarse particle. The best test is to actually prepare compacts of the $UO_2$ powder under standard conditions of from about 5,000 to 50,000 psi pressure and to sinter at from 1,600°C to 1,800°C, and testing the pellets for their strength, shape, homogeneity and freedom from cracks and other flaws, that one can characterize the ceramic pelletizing characteristics of the ADU particles. The ADU product of the present invention has shown excellent ceramic properties and pellets of enriched uranium dioxide, for example 3 percent enrichment, have been made therefrom into fully acceptable nuclear fuel elements.

I claim as my invention:

1. A process for the substantially complete recovery of the uranium in uranium hexafluoride as ammonium diuranate, comprising the steps of:
   a. contacting water with the uranium hexafluoride to produce an acidic aqueous hydrolysis solution containing uranyl fluoride and hyrogen fluoride,
   b. adding aqueous ammonium hydroxide of a concentration of at least 6 molar to the acidic aqueous hydrolysis solution to produce a first neutralized solution having a pH of from 4.5 to 6.0, the added ammonium hydroxide being sufficient to react with only from about 85 to 95 percent of the hydrogen fluoride in the solution and with substantially none of the uranyl fluoride,
   c. thereafter rapidly admixing the first neutralized solution while it is at a temperature of from 125°F to 175°F with aqueous ammonium hydroxide at a temperature below 100°F and of a molarity of at least 3 in an amount to provide at least two times the stoichiometric quantity needed to convert all of the uranium in the first neutralized solution to ammonium diuranate, the resulting solution having a pH of at least 9.5, and the ammonium diuranate so produced precipitating rapidly as a fine precipitate to form a slurry,
   d. digesting the slurry at a temperature of about 40°C to 70°C for a period of about 5 to 30 minutes, and
   e. separating a major portion of the liquid from the digested ammonium diuranate particles, only sufficient liquid being present to produce a flowable or pumpable ammonium diuranate slurry end product.

2. The process of converting uranium hexafluoride to uranium dioxide powder having good ceramic pelletizing properties, comprising the steps of:
   a. contacting water with the uranium hexafluoride to produce an acidic aqueous hydrolysis solution containing uranyl fluoride and hydrogen fluoride,
   b. adding aqueous ammonium hydroxide of a concentration of at least 6 molar to the acidic aqueous hydrolysis solution to produce a first neutralized solution having a pH of from 4.5 to 6.0, the added ammonium hydroxide being sufficient to react with only from about 85 to 95 percent of the hydrogen fluoride in he acidic solution and with substantially none of the uranyl fluoride,
   c. thereafter rapidly admixing the first neutralized solution while it is at a temperature of from 125°F to 175°F with aqueous ammonium hydroxide at a temperature below 100°F and of a molarity of at least 3 in an amount to provide at least two times the stoichiometric quantity needed to convert all of the uranium in the first neutralized solution to ammonium diurante, the resulting solution having a pH of at least 9.5, and the ammonium diuranate so produced precipitating rapidly as a fine precipitate to form a slurry,
   d. digesting the slurry at a temperature of about 40°C to 70°C for a period of about 5 to 30 minutes,
   e. separating a major portion of the liquid from the digested ammonium diuranate particles, only sufficient liquid being present to produce a flowable or pumpable ammonium diuranate slurry end product, and
   f. calcining the ammonium diuranate slurry at temperatures up to about 1,000°C whereby to evaporate all the liquid, and decompose the ammonium diuranate in the presence of a reducing atmosphere to produce a pure uranium dioxide powder.

* * * * *